March 30, 1954 E. C. UHLIG 2,673,371
METHOD OF MOLDING THERMOPLASTIC ARTICLES
Filed Feb. 1, 1951 2 Sheets-Sheet 2
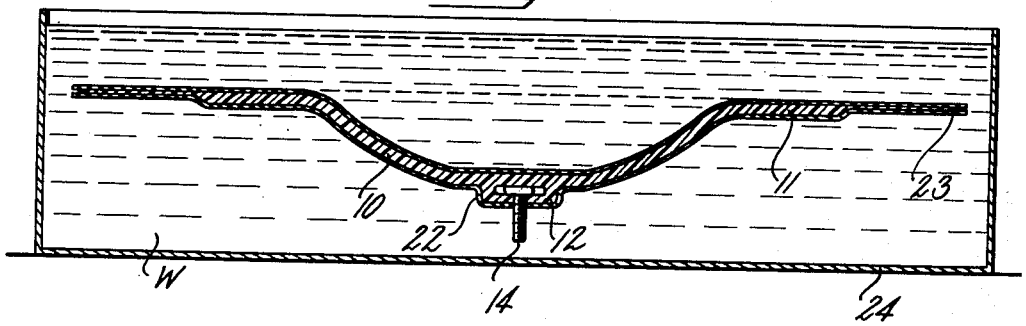
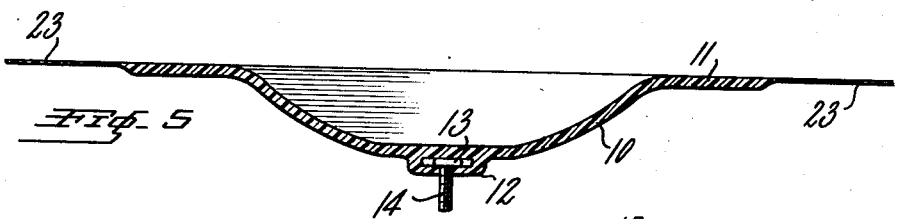
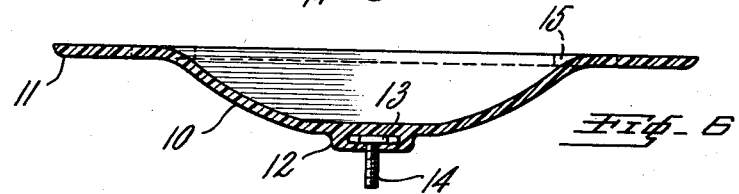
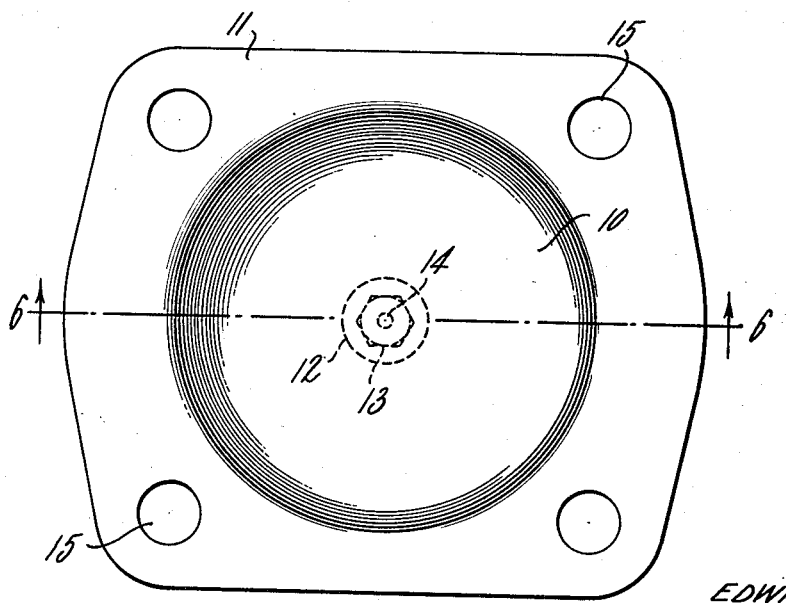
INVENTOR.
EDWIN C. UHLIG
BY
Charles G. Willson
ATTORNEY Patented Mar. 30, 1954

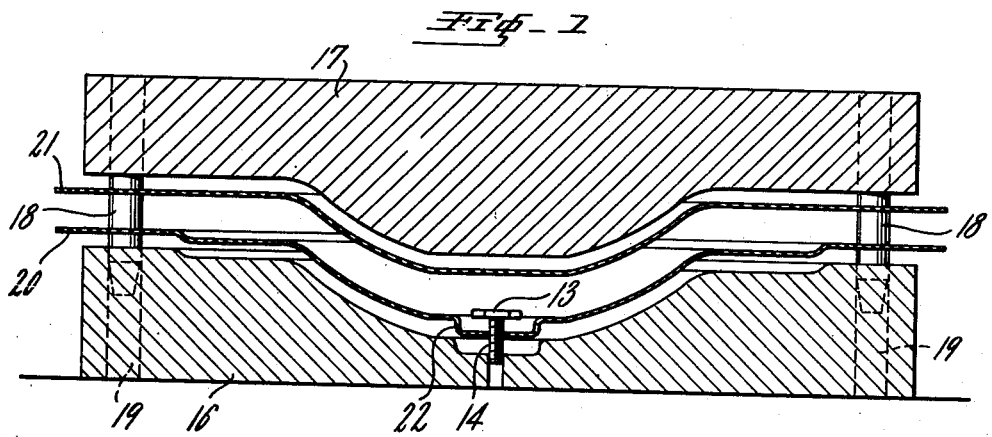
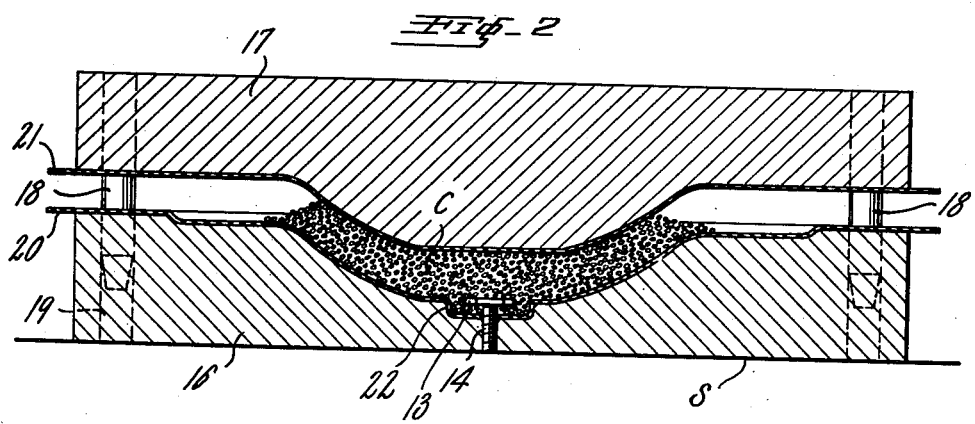
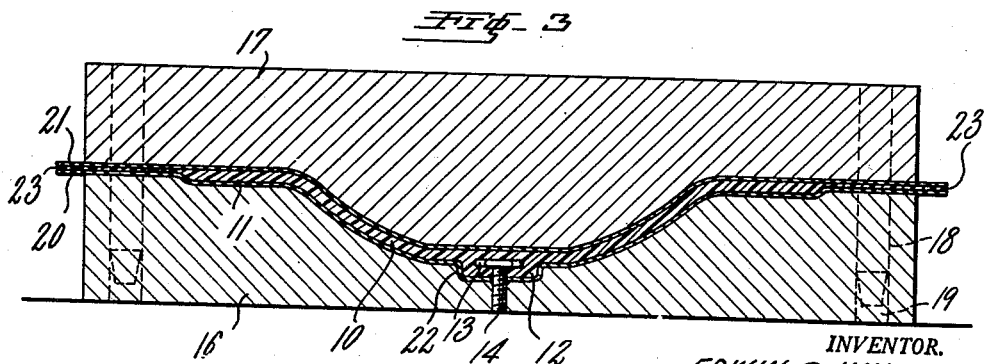

2,673,371

UNITED STATES PATENT OFFICE 2,673,371

METHOD OF MOLDING THERMOPLASTIC ARTICLES

Edwin C. Uhlig, Greenwood, R. I., assignor to United States Rubber Company, New York, N. Y., a corporation of New Jersey Application February 1, 1951, Serial No. 208,858

9 Claims. (Cl. 18—55)

This invention relates to a novel method of forming thermoplastic articles, and more particularly to a method of shock cooling a hot molded thermoplastic article from its molding temperature to well below the transition temperature of the plastic, to maintain the major portion of the cooled plastic in an amorphous state.

In order to impart maximum physical properties to certain thermoplastic articles, such as high tensile, toughness, and good resistance to flex cracking, it is necessary to maintain the finished molded plastic article in an amorphous state rather than in a crystalline state. This is because if the molded plastic is in a crystalline state it will crack readily on repeated flexings. Thermoplastics of the types herein referred to will exist in the amorphous state if they are cooled rapidly from the molding temperature to well below the plastic transition temperature.

There are now available on the market polymeric types of compound which may exist in either a crystalline or amorphous state, and the condition of such state can be controlled within limits by the time-temperature treatment of the polymer; i. e., by heating it above the transition temperature, the polymer will exist in the amorphous state, and this state can be maintained by suddenly cooling the polymer to well below the transition temperature. On the other hand crystallinity will occur if the polymer is heated above the transition temperature and then allowed to cool slowly. With these materials the physical properties of the plastic are improved as crystallinity within its physical structure is reduced. One thermoplastic material which is well adapted to be treated for maintenance of the plastic in a molded article in a highly amorphous state in accordance with the present method is trifluorochloroethylene, sold commercially by M. W. Kellogg Co. as "Kel F." Other materials which are also applicable to this invention will be hereinafter described.

The quick cooling of the hot molded thermoplastic material required to impart minimum cystalline formation in a finished article, can be secured by molding the plastic in a very thin metal mold and then plunging the hot mold with the plastic material contained therein into a cooling bath of liquid. However, in order for this method to be practical, the mold walls would have to be so thin that they would collapse under the pressures required to cause the heated plastic to conform to the cavity walls in the mold. Further should this difficulty be overcome by use of a more rugged mold construction, this would not be satisfactory because the heat of the mold will retard the chilling of the plastic article within the mold, and if the mold has to be heated and then chilled for each article produced therein, the output of the mold will be low and the cost of producing the molded articles will be high.

Having in mind the foregoing, a primary feature of the present invention resides in the method whereby a thermoplastic material having the above mentioned properties may be molded to the desired shape in a hot mold and then while in the heated, plastic, or semi-plastic condition, it can be removed from the mold and plunged into a cooling bath without distorting such molded plastic article from the desired shape. This operation is accomplished in accordance with the present invention by providing a mold having a lower section and a separable upper section and shaped so that when the mold is closed a cavity that is to receive the plastic material is provided, and by also providing a thin metal foil liner shaped to the contour of the mold face of the lower and upper mold sections. These liners form a sandwich with the molded plastic so that this liner-molded plastic assembly may be quickly removed from the hot mold and quick quenched by plunging the assembly into a cooling bath, without distorting the shaped molded plastic. It is extremely important that each liner be accurately shaped to the mold contour before the charge of plastic material is introduced into the mold so as to be sure that the desired shape will be imparted to the molded article.

The pre-shaped liner can be formed of any one of a number of metals having the required physical properties and is preferably formed of metal foil having a thickness of anywhere from a few thousandths of an inch to about two or three hundredths of an inch.

Various means may be employed for pre-shaping the foil liners so that they will conform accurately to the mold surfaces. One simple way of accomplishing this is to place a thin sheet of metal foil over a face of the lower mold section, then place on this sheet a piece of soft vulcanized rubber of the approximate size of the mold cavity but preferably somewhat larger, then place over this piece of rubber a second foil sheet. The mold is then tightly closed so that the yielding rubber charge will force both liner sheets into intimate contact with the mold face portions of the mold cavity. If in molding the thermoplastic material it is necessary to make provision for the thickness of the liner covering the opposite faces thereof, it may then be desirable to use a slightly oversized mold so that the cavity in which the plastic article is to be molded will have the thickness of the plastic article to be produced therein plus the thickness of the upper and lower liner sheets. After the liners just mentioned have been given the desired shape in the manner just described or by any other suitable operation, they may be employed in the following manner.

The method of the present invention is preferably carried out by preheating the thermoplastic material to a temperature somewhat near but below its softening temperature, however this is not essential to the operation of this method. Next a charge of the heated thermoplastic material which has been carefully weighed or measured so that it will accurately fill the mold with a slight excess that will produce some flashing is introduced in the mold to lie between the two pre-shaped liner sheets above mentioned. In order to speed up production the mold is preferably maintained at a temperature considerably above the softening temperature of the plastic being molded. The mold is then closed at such a rate that its heat will soften the charge and render it sufficiently plastic to permit it to flow within the mold, and then the mold is completely closed to cause the plastic to conform under pressure to the mold cavity.

It will be understood that the molded thermoplastic material contacts the liner sheets rather than the interior of the mold proper. These liner sheets, due to the fact that they were accurately shaped to the interior of the mold before they were engaged by the plastic charge, do not depend upon the pressure exerted by the plastic charge to force them into accurate conformity with the walls of the mold cavity. Since the hot molded thermoplastic material exhibits greater adhesion to the smooth surface of the liner, than the liner exhibits to the metal mold surface, the liners will adhere to the molded plastic rather than to the face of the mold. As a result, when the hot mold is opened the liners and the molded thermoplastic material can be removed together as a sandwich, and while the molded article is at this time soft and readily distorted from its molded shape, it is supported sufficiently by the liner sheets to enable it to be transferred quickly from the mold and plunged into a cooling bath of liquid without distortion from the desired shape, to thereby produce a strong, tough, molded, thermoplastic article having the major portion of the plastic in the amorphous state.

The above and other features of the method of the present invention will be further understood from the following description when read in connection with the accompanying drawings showing one form of apparatus for carrying out the method.

In the drawings:

Fig. 1 is a vertical sectional view through a mold shown partly open and having two shaped liner sheets in the mold that are shown in spaced relation to each other and to the mold faces;

Fig. 2 is a view similar to Fig. 1 showing the liner sheets engaging the respective faces of the mold and also showing a plastic charge introduced between these liners;

Fig. 3 is a view similar to Fig. 2 but shows the mold completely closed with the charge molded to the desired shape and confined between the two liner sheets;

Fig. 4 is a vertical sectional view through a tank containing a bath of cooling liquid, and having immersed therein the sandwich comprising the molded plastic article and liner sheets stuck to the plastic;

Fig. 5 is a vertical sectional view showing the molded plastic article of Fig. 4 with the liners removed therefrom;

Fig. 6 is a vertical sectional view showing the molded article of Fig. 5 after the flashing has been trimmed therefrom and the corner holes have been drilled therein; and Fig. 7 is a top plan view of Fig. 6.

The method of the present invention can be employed to mold thermoplastic materials in various shaped molds, having either shallow or deep molding cavities, and may be employed to mold various size articles. The finished article shown in Figs. 6 and 7 of the drawing is a diaphragm for use in a diaphragm valve employed to handle corrosive liquids at elevated temperatures. In use the diaphragm is flexed back and forth thereby placing great flexing strains on the dome shaped bulge of the diaphragm. The fact is that there are relatively few known materials which will stand up for a long period of use under the exacting treatment just mentioned, and it is found that the life of the diaphragm shown in the drawing is greatly extended by removing it from the mold at high temperature and shock cooling it as contemplated by the present invention. The diaphragm shown may range in size from less than two inches in its major diameter to a diameter of ten to twelve inches.

The finished diaphragm shown in Figs. 6 and 7 of the drawing and which serves to illustrate one good practical embodiment of the present invention is an integral plastic article formed with a central dome portion 10 surrounded by a flat outer flange portion 11. The dome portion 10 has projecting therefrom the central boss portion 12 and within this boss portion is embedded the head 13 of a threaded bolt 14. This bolt serves to clamp the dome portion of the diaphragm to means, not shown, employed to flex the diaphragm to effect the desired valve operation, and in order that the diaphragm may be secured in its operating position the peripheral portion 11 thereof has formed therein the drill holes 15 adapted to receive clamping means, not shown.

The diaphragm of Figs. 6 and 7 is produced, in accordance with the present invention, by providing the metal mold shown in Figs. 1, 2 and 3 of the drawing and comprising the lower mold section 16 and upper mold section 17. The upper section is shown as provided with the usual dowel pins 18 adapted to slide in the holes 19 formed in the lower section to thereby properly align one mold section relatively to the other. The lower mold section 16 is shown as resting upon a supporting surface S.

As above stated, in accordance with the present invention the molding surfaces of the mold 16, 17 are covered with pre-shaped liner sheets 20 and 21 which may be formed of thin aluminum foil or other thin sheet material that is non-corroding, and sufficiently resistant to the relatively high molding temperatures used, and has the other required physical properties. Each sheet 20 and 21 is accurately pre-shaped prior to the plastic molding operation so that each sheet will conform accurately to the contour of the molding cavity when placed in the mold and will not need the pressure exerted upon the plastic charge to shape such foil to the contour of the mold. The liner sheets 20 and 21 are shown in Fig. 1 as spaced somewhat from their respective mold faces, to illustrate the fact that these liners are pre-shaped. It will be noted that the lower liner 20 has the relatively deep pocket 22 adapted to form the boss 12 above mentioned. This pocket has a central hole formed therein to receive the threaded portion 14 of the bolt, with the head 13 disposed inside of this pocket. The arrangement is preferably such that when the lower liner 20 engages the molding face of the lower mold section 16 as shown in Fig. 2 the lower end of the bolt 14 will engage the mold supporting surface S, to thereby hold this head 13 of the bolt in spaced relation to the cup portion 22 of the liner as shown in Fig. 2. This will permit the plastic material introduced into the mold to flow around the bolt head as shown in Fig. 3. In Fig. 2 the mold is shown as having the charge C of thermoplastic material introduced between the liner sheets 20 and 21. Before this charge C is introduced into the mold it is preferably preheated to speed up the molding operation, and if the charge C is trifluorochloroethylene (Kel F), it is preferably preheated to about 325° F., and the mold in this case is preferably maintained at a temperature of about 510° F.

After the mold has been charged as shown in Fig. 2 of the drawing and the heat of the mold has penetrated the charge sufficiently to render it soft and plastic, the mold may be closed as shown in Fig. 3, and the charge C introduced into the mold should be sufficiently large to fully fill the mold cavity between the liner sheets 20 and 21 and cause some flashing to be formed as indicated by 23.

After the charge C has been molded to the desired shape as shown in Fig. 3, the mold is opened so that the sandwich consisting of the molded article 10, 11 having the foil sheets 20 and 21 adhered thereto may be removed from the mold, without distorting this hot, soft plastic article. It is important that the molded material that forms the article 10, 11 be in a flaccid, strain-free condition when removed from the mold. The sandwich is then inserted quickly into a liquid such as the water W confined in the tank 24, to quickly chill this sandwich from the molding temperature to well below the transition temperature of the plastic in less than one minute, to impart the desired amorphous properties to the plastic material. The liquid in the tank 24 may be maintained at room temperature or lower as desired. The term "transition temperature" as herein used is the temperature at which the plastic changes from a solid to a plastic or semi-plastic state.

After the molded article has been chilled by the liquid W it is removed from the tank and the liner sheets 20 and 21 are stripped therefrom. If they are torn during this stripping operation, this is not serious and are discarded since these preformed sheets are not expensive to make. When the liner sheets are removed from the molded article, this article will appear as shown in Fig. 5. Then after the flashing 23 is trimmed therefrom and the holes 15 are drilled therein the operation of producing the diaphragm shown in Figs. 6 and 7 of the drawing will be completed.

In order to secure a molded thermoplastic article having the strength, toughness, flexibility and other desired properties, the plastic to be used must be carefully selected and the same is preferably a polymeric type of compound which may exist in either a crystalline or an amorphous state, and wherein the condition of such state can be controlled within limits by the time-temperature history of the polymer and the quick cooling of the hot molded plastic.

Examples of such thermoplastic materials are the following: polyethylene (polythene), trifluorochloroethylene (Kel F), difluorochloroethylene, vinylidine chloride copolymers such as Saran.

The first three of these thermoplastics are of the polyethane type, the fourth is of a different type.

Certain features of the present invention may be used to facilitate the molding of various thermoplastic materials, but the pre-shaped metal foil liners are peculiarly well adapted for use in carrying out the present invention, since they satisfactorily support the soft molded article while it is being removed from the hot mold, and permit the quick chilling of the article when it and the liners are plunged into a cooling bath.

Having thus described my invention, what I claim and desire to protect by Letters Patent is:

1. The method of forming a thermoplastic article having a minimum crystallinity which comprises, providing a hot mold having a lower section and a separable upper section, covering the face of each section with a thin pre-formed metal foil liner at least several thousandths of an inch thick and shaped to fit the contour of the mold cavity so that it is backed throughout by the mold, introducing a charge of thermoplastic material into the mold between the liners, closing the mold under pressure so that its heat will soften the charge and render it plastic to cause it to conform under pressure to the lined mold cavity, then removing the hot molded charge while in a flaccid condition and foil liners as a sandwich while the liners hold the charge to the molded shape, and plunging this hot sandwich into a cooling bath to shock cool the molded plastic, and then stripping the liners from the cooled plastic article.

2. The method of forming a thermoplastic article having a minimum crystallinity which comprises, providing a hot mold having a lower section and a separable upper section, covering the face of each section with a thin pre-formed metal foil liner at least several thousandths of an inch thick shaped to fit the contour of the mold cavity so that it is backed throughout by the mold, introducing a charge of thermoplastic material into the mold between the liners, closing the mold under pressure so that its heat will soften the charge and render it plastic to cause it to conform under pressure to the lined mold cavity, then removing the hot molded charge while in a flaccid condition and foil liners as a sandwich while the liners hold the charge to the molded shape, and plunging this hot sandwich into a cooling bath to shock cool the molded plastic to maintain the major portion of the plastic in the amorphous state.

3. The method of forming a thermoplastic article having a minimum crystallinity which comprises, providing a hot mold having a lower section and a separable upper section, covering the face of each section with a thin pre-formed metal foil liner at least several thousandths of an inch thick and shaped to fit the contour of the mold cavity, introducing a charge of thermoplastic material into the mold between the liners, closing the mold under pressure so that its heat will soften the charge and render it plastic to cause it to conform under pressure to the lined mold cavity, then removing the hot molded charge while in a flaccid condition and foil liners as a sandwich while the liners hold the charge to the molded shape, and plunging this hot sandwich into a cooling bath to shock cool the molded plastic and reduce its temperature from the molding temperature to well below its transition temperature in not more than one minute.

4. The method of forming a thermoplastic article having a minimum crystallinity which comprises, providing a hot mold having a lower section and a separable upper section, covering the face of each section with a thin pre-formed metal foil liner at least several thousandths of an inch thick and shaped to fit the contour of the mold cavity, introducing a charge of a thermoplastic high molecular weight crystallizable polymeric material into the mold between the liners, closing the mold under pressure so that its heat will soften the charge and render it plastic to cause it to conform under pressure to the lined mold cavity, then removing the hot molded charge while in a flaccid condition and foil liners as a sandwich while the liner holds the charge to the molded shape, and plunging this hot sandwich into a cooling bath to shock cool the molded plastic, to minimize crystallinity in the cooled plastic.

5. The method of forming a thermoplastic article having a minimum crystallinity which comprises, providing a hot mold having a lower section and a separable upper section, covering the face of each section with a thin pre-formed metal foil liner at least several thousandths of an inch thick and shaped to fit the contour of the mold cavity, introducing into the mold between the liners a charge of polyethane type of plastic material, closing the mold under pressure so that its heat will soften this material and render it plastic to cause it to conform under pressure to the lined mold cavity, then removing the sandwich consisting of the hot molded plastic in a flaccid condition and liners and quickly cooling this hot sandwich to well below the transition temperature of the plastic, and removing the liners from the molded plastic.

6. The method of forming a thermoplastic article having a minimum crystallinity which comprises, providing a hot mold having a lower section and a separable upper section, covering the face of each section with a thin pre-formed metal foil liner at least several thousandths of an inch thick and shaped to fit the contour of the mold cavity, introducing into the mold between the liners a charge of thermoplastic material selected from the group consisting of polyethylene, trifluorochloroethylene and difluorodichloroethylene, closing the lined mold under pressure so that its heat will soften this material and render it plastic to cause it to conform under pressure to the mold cavity, then removing the sandwich consisting of the hot molded plastic in a flaccid condition and liners and quickly cooling this hot sandwich to well below the transition temperature of the plastic.

7. The method of forming a strong, tough, molded article having a minimum crystallinity which comprises, providing a hot mold having a lower section and a separable upper section, covering the face of each section with a thin preformed metal foil liner at least several thousandths of an inch thick and shaped to fit the contour of the mold cavity, introducing a charge of trifluorochloroethylene into the mold between the liners, closing the mold under pressure so that its heat will soften the charge and render it plastic to cause it to conform under pressure to the lined mold cavity, then removing the foil liner-molded plastic assembly while the plastic is in a flaccid condition and quickly cooling the assembly to below the transition temperature of the plastic to maintain the major portion of the plastic in the amorphous state.

8. The method of forming a strong, tough, molded article having a minimum crystallinity which comprises, providing a hot mold having a lower section and a separable upper section, covering the face of each section with a thin preformed metal foil liner at least several thousandths of an inch thick and shaped to fit the contour of the mold cavity, introducing a charge of trifluorochloroethylene into the mold between the liners, closing the mold under pressure so that its heat will soften the charge and render it plastic to cause it to conform under pressure to the lined mold cavity, then removing the foil liner-molded plastic assembly while the plastic is in a flaccid condition and cooling the plastic from the molding temperature to well below its transition temperature in less than one minute.

9. The method of forming a strong, tough, molded article having a minimum crystallinity which comprises, providing a hot mold having a lower section and a separable upper section, covering the face of each section with a thin preformed metal foil liner at least several thousandths of an inch thick and shaped to fit the contour of the mold cavity, introducing a charge of trifluorochloroethylene into the mold between the liners, closing the mold under pressure so that its heat will soften the charge and render it plastic to cause it to conform under pressure to the lined mold cavity, then removing the foil liner-molded plastic assembly while the plastic is in a flaccid condition so that the liners hold the plastic to the molded shape, and plunging this hot assembly into a cooling bath to cool the plastic from its molding temperature to well below its transition temperature in less than one minute.

EDWIN C. UHLIG.

References Cited in the file of this patent

UNITED STATES PATENTS

| Number | Name | Date |
|---|---|---|
| Re. 13,988 | Eggers | Sept. 28, 1915 |
| 457,192 | Garriques | Aug. 4, 1891 |
| 2,219,700 | Perrin et al. | Oct. 29, 1940 |
| 2,336,578 | Skoning | Dec. 14, 1943 |
| 2,497,009 | Minuto | Feb. 7, 1950 |
| 2,501,859 | Babbitt | Mar. 28, 1950 |